United States Patent
Hanson et al.

(10) Patent No.: US 8,833,699 B2
(45) Date of Patent: Sep. 16, 2014

(54) VEHICLE DOOR LOCK

(75) Inventors: Oliver Colin Hanson, Shoreview, MN (US); Richard David Sedgwick, Minnetonka, MN (US)

(73) Assignee: Target Brands, Inc., Minneapolis, MN (US)

(*) Notice: Subject to any disclaimer, the term of this patent is extended or adjusted under 35 U.S.C. 154(b) by 582 days.

(21) Appl. No.: 13/044,296

(22) Filed: Mar. 9, 2011

(65) Prior Publication Data

US 2012/0228429 A1 Sep. 13, 2012

(51) Int. Cl.
- B64C 1/14 (2006.01)
- E05B 65/08 (2006.01)
- E06B 3/46 (2006.01)
- E05C 7/00 (2006.01)

(52) U.S. Cl.
CPC .......... B64C 1/1469 (2013.01); E05B 65/0894 (2013.01); E06B 3/4654 (2013.01); E05C 2007/007 (2013.01)
USPC ..................................................... 244/129.4

(58) Field of Classification Search
USPC ........ 244/129.4; 206/451; 292/256, 258, 288, 292/289, 292
See application file for complete search history.

(56) References Cited

U.S. PATENT DOCUMENTS

| | | | |
|---|---|---|---|
| 262,319 A | 8/1882 | Ritz et al. | |
| 1,724,362 A | 11/1926 | Peterson | |
| 2,003,856 A | 2/1932 | Gimbel | |
| 2,021,037 A | 12/1933 | Walper | |
| 2,514,738 A * | 7/1950 | Bradley | 292/258 |
| 2,899,229 A * | 8/1959 | Jenks | 292/288 |
| 3,854,764 A * | 12/1974 | Corrigan | 292/289 |
| 3,997,205 A | 12/1976 | MacDonald | |
| 4,082,334 A | 4/1978 | Volta et al. | |
| 4,372,136 A * | 2/1983 | Mickelson | 70/14 |
| 4,993,761 A * | 2/1991 | Paskert | 292/288 |
| 5,203,597 A | 4/1993 | Weelock | |
| 5,209,533 A | 5/1993 | Menard | |
| 5,294,160 A * | 3/1994 | Arthur | 292/258 |
| 5,386,664 A | 2/1995 | Lumenello | |
| 5,462,323 A * | 10/1995 | Benninger | 292/292 |
| 5,620,215 A * | 4/1997 | Janeway | 292/256 |
| 5,664,815 A | 9/1997 | Kornder | |
| 5,709,422 A | 1/1998 | Malone | |
| 5,934,718 A | 8/1999 | La Valle | |
| D433,308 S * | 11/2000 | Winston | D8/330 |
| 6,641,185 B2 * | 11/2003 | Hale et al. | 292/289 |
| 6,823,927 B2 * | 11/2004 | Steel et al. | 160/210 |
| 7,344,167 B2 | 3/2008 | Johnson et al. | |
| 7,798,542 B2 | 9/2010 | Frazier et al. | |

* cited by examiner

Primary Examiner — Valentina Xavier
(74) Attorney, Agent, or Firm — Nixon & Vanderhye P.C.

(57) ABSTRACT

A vehicle has a passenger section, a control section and a door positioned between the passenger section and the control section. The door has an indented region on a side of the door facing the control section when the door is in a closed position, where the indented region has a surface. The vehicle also includes a second surface. A locking mechanism has a first locking portion, a second locking portion and a connecting portion connecting the first locking portion and the second locking portion. The locking mechanism locks the door in the closed position when the first locking portion engages the surface of the indented region and the second locking portion engages the second surface.

13 Claims, 12 Drawing Sheets

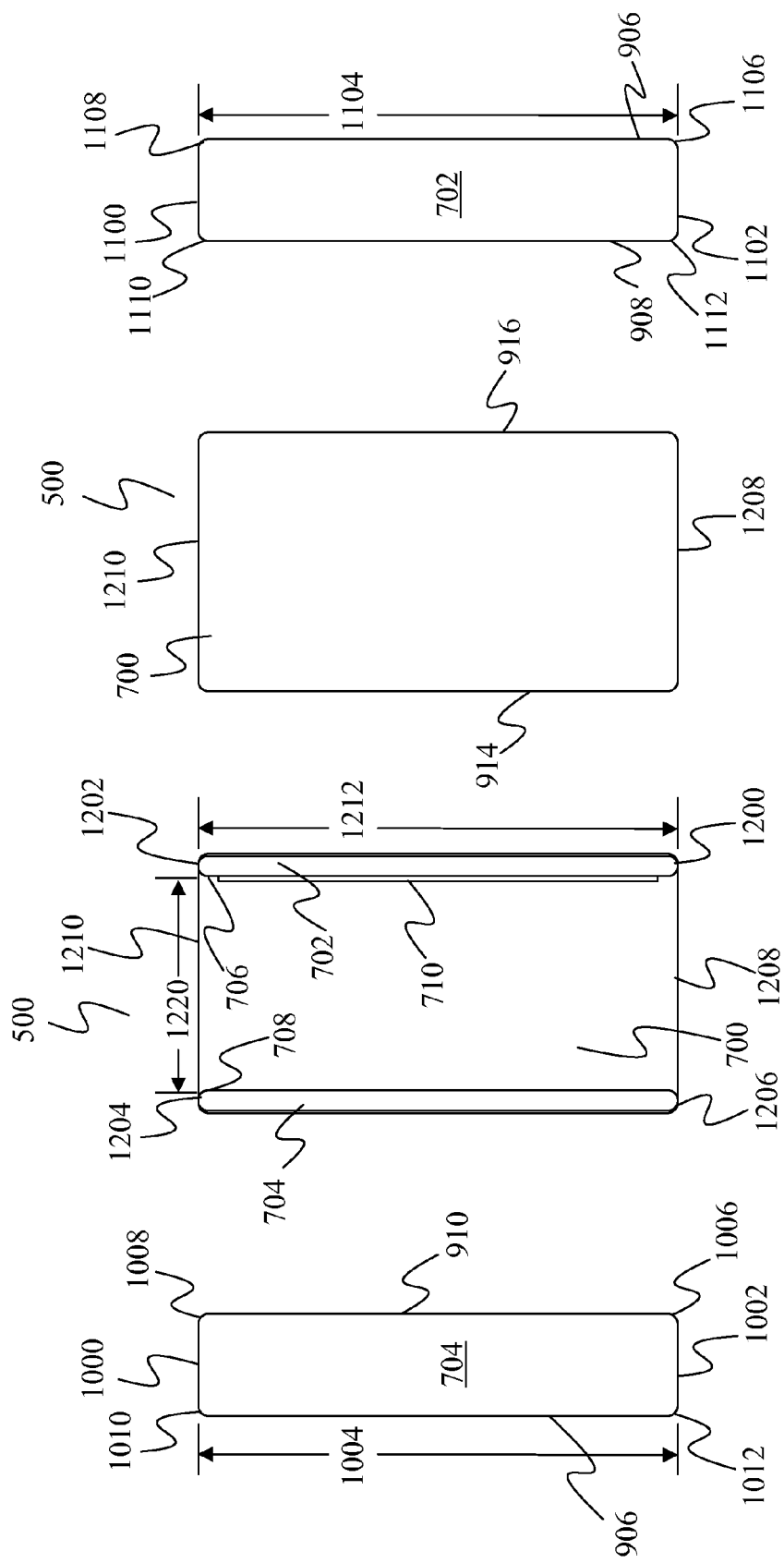

VEHICLE DOOR LOCK

BACKGROUND

Private jet aircraft are typically designed with a cockpit area where the pilot and co-pilot sit while flying the plane and a passenger area located behind the cockpit. The cockpit area may be separated from the passenger area by a curtain or door(s).

The discussion above is merely provided for general background information and is not intended to be used as an aid in determining the scope of the claimed subject matter.

SUMMARY

A vehicle has a passenger section, a control section and a door positioned between the passenger section and the control section. The door has an indented region on a side of the door facing the control section, where the indented region has a surface. The vehicle also includes a second surface. A locking mechanism has a first locking portion, a second locking portion and a connecting portion connecting the first locking portion and the second locking portion. The locking mechanism locks the door in the closed position when the first locking portion engages the surface of the indented region and the second locking portion engages the second surface.

A method includes closing an aircraft door between a cockpit area and a passenger area and applying a free standing locking mechanism to a recessed area of the door and a second portion of the aircraft so as to lock the door in the closed position.

A locking mechanism has a single piece of material that defines a first extending arm, a second extending arm and a curved connecting portion. The first extending arm has one of a loop or hook material mounted thereon. The heights of the first and second extending arms are greater than their respective lengths and the height of the curved portion is substantially the same as the height of the first and second extending arms. The first extending arm extends from the curved portion at a first junction and the second extending arm extends from the curved portion at a second junction. The shortest distance between the first junction and the second junction is less than the shortest distance between the first junction and the second junction along the curved portion. The height of the curved portion is greater than the shortest distance between the first junction and the second junction along the curved portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 10 is a side view of the locking mechanism of FIG. 7.

FIG. 11 is a side view of the locking mechanism of FIG. 7.

FIG. 12 is back view of the locking mechanism of FIG. 7.

FIG. 13 is a front view of the locking mechanism of FIG. 7.

DETAILED DESCRIPTION

Embodiments described below provide a locking mechanism for locking cockpit doors on jet aircraft. Under one embodiment, the locking mechanism is a U-shaped piece of material that engages surfaces on indented portions of the two cockpit doors and spans the joint where the two doors come together. The U-shaped material has two extending arms that engage the surfaces of the doors and a connecting portion that connects the two extending arms. Under some embodiments, the connecting portion is curved slightly to provide a spring force that directs the doors toward one another. In some embodiments, one of the extending arms has a piece of hook or loop material (such as Velcro® brand hook and loop material) adhered to it while the other extending arm is bare. In such embodiments, another piece of hook or loop material is adhered to the surface of the indented portion of one door so that the piece of hook or loop material on the extending arm couples to the piece of hook or loop material on the door. By leaving the other extending arm bare, it is easier to slide the locking mechanism into engagement with the doors and to disengage the locking mechanism from the doors than if a hook and loop material were applied to both extending arms.

Under some embodiments, the locking mechanism is free standing such that the U-shaped piece may be removed entirely from the aircraft or may be stored out of sight within the aircraft. Further, the locking mechanism engages the door without requiring any portion of the aircraft to be drilled or physically damaged in any manner.

Figure 1:
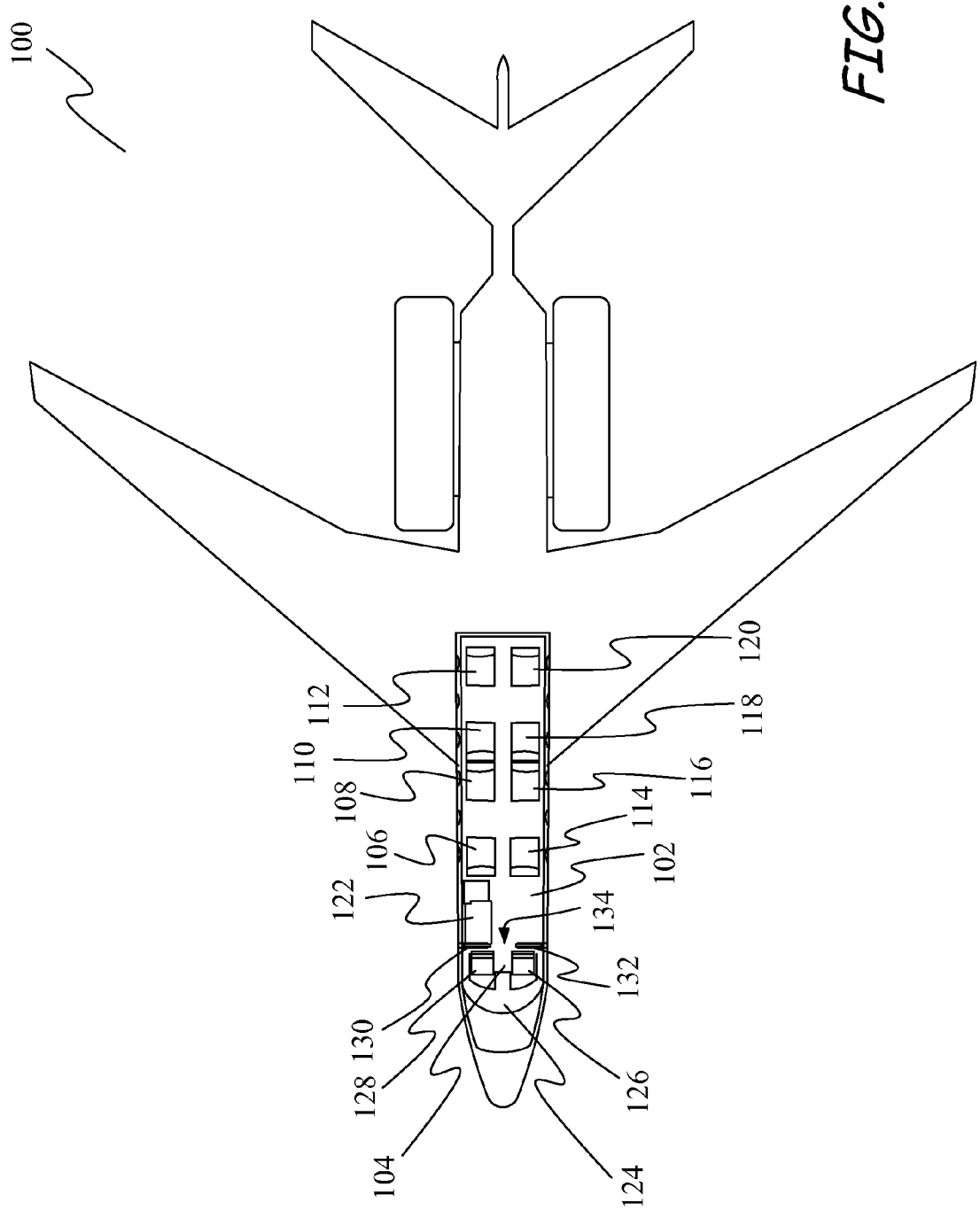
FIG. 1 is a top diagrammatic view of an aircraft.

FIG. 1 provides a top diagrammatic view of an aircraft 100 having a passenger area or section 102 and a control section or cockpit area 104. Passenger area 102 contains seats such as seats 106, 108, 110, 112, 114, 116, 118 and 120 as well as a galley 122, and provides an area where passengers may ride in the vehicle.

Cockpit area 104 includes instruments 124, pilot seat 126 and copilot seat 128. In cockpit area 104, a pilot controls the movement of the aircraft using one or more of the instruments 124. Between passenger area 102 and cockpit area 104 are a pair of pocket doors 130 and 132. Pocket doors 130 and 132 are capable of being slid together to close a passage 134 between passenger area 102 and cockpit area 104 or slid apart to open passage 134.

The example aircraft 100 shown in FIG. 1 is a private jet aircraft. The present embodiments are not limited to jet aircraft and may be applied to other aircraft and other vehicles in which one or more doors separate a passenger area from an area where the movement of the vehicle is controlled. Further, the present embodiments are not limited to vehicles with two doors separating the passenger area from the control area and the embodiments may be used with vehicles that have a single door separating the passenger area from the control area.

Figure 2:
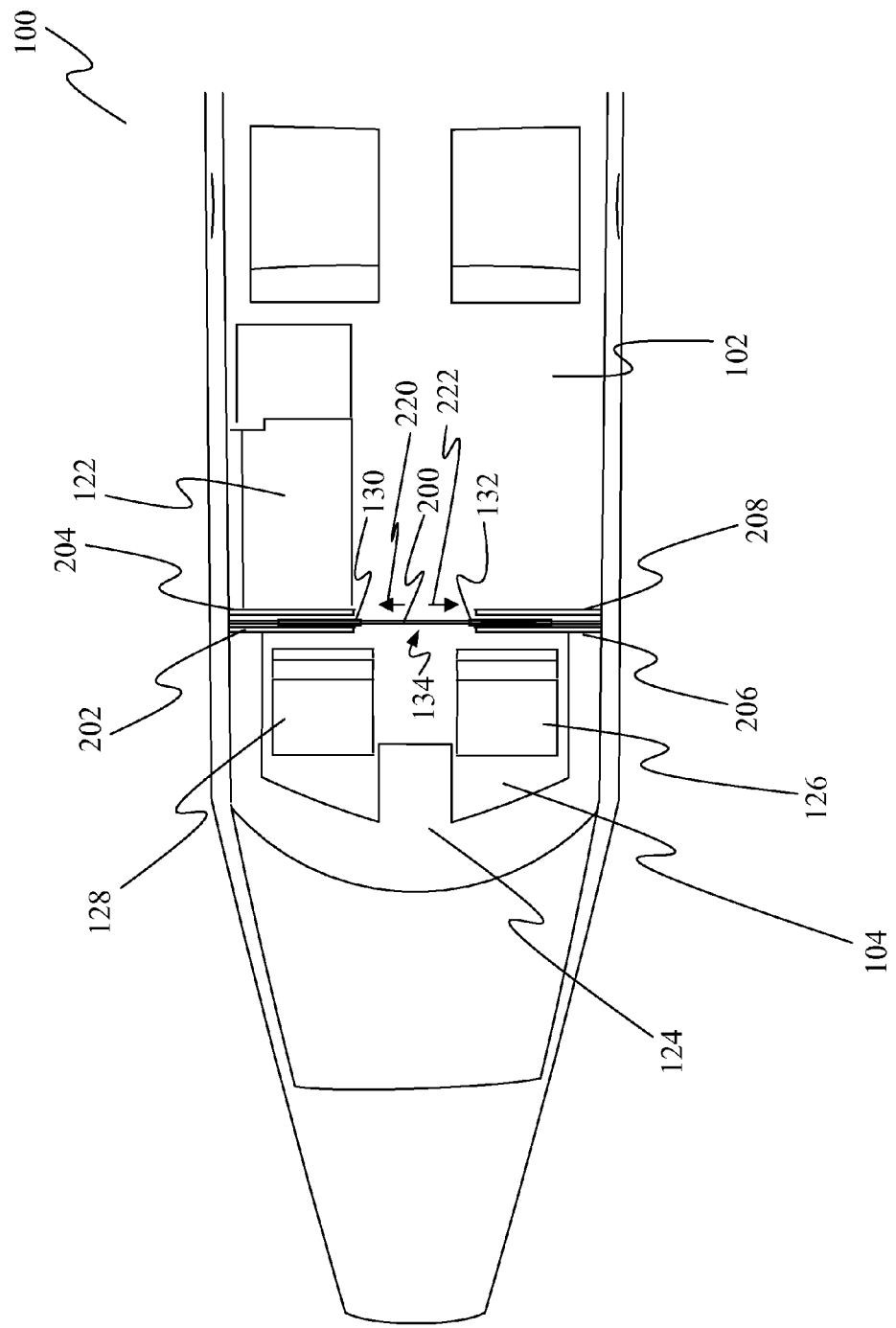
FIG. 2 is an enlarged top cross-sectional view of a portion of the aircraft to FIG. 1.

FIG. 2 provides an expanded top sectional view of aircraft 100 of FIG. 1 showing cockpit area 104, doors 130 and 132 and passenger area 102 in more detail.

In FIG. 2, doors 130 and 132 are shown to hang from a track 200 by way of rolling wheels (not visible) that allow doors 130 and 132 to be moved laterally along directions 220 and 222. Door 130 can be moved within two wall segments 202 and 204 and into passageway 134. Wall segment 202 is on the cockpit side of door 130, and wall segment 204 is on the passenger side of door 130. Similarly, door 132 can be moved within two wall segments 206 and 208 and into passageway 134. Wall segment 206 is on the cockpit side of door 132 and wall segment 208 is on the passenger side of door 132. Such doors are sometimes referred to as pocket doors.

Figure 3:
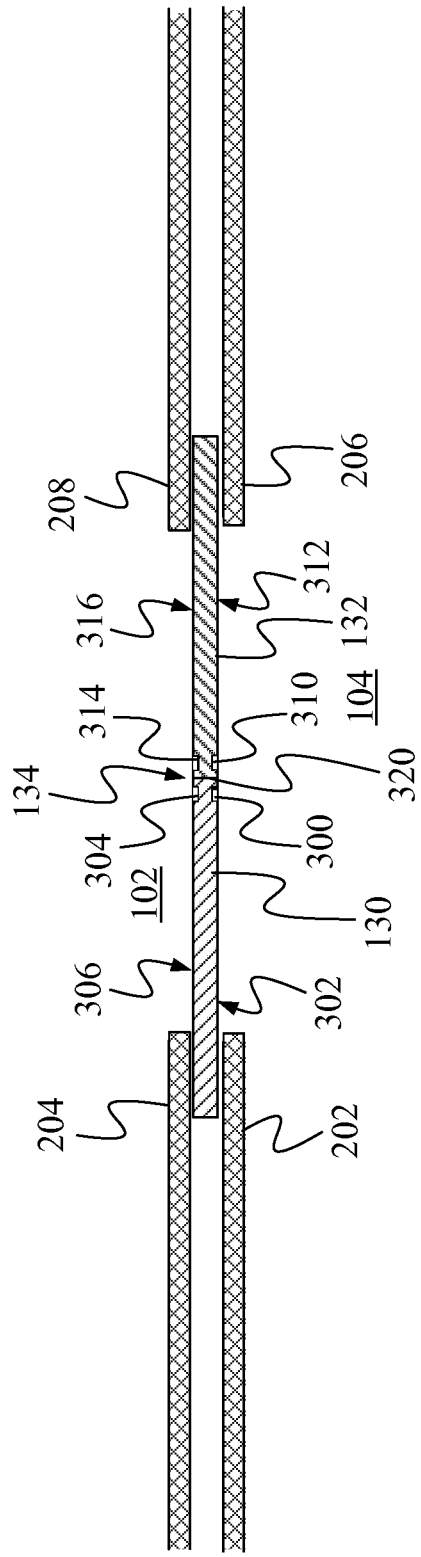
FIG. 3 is a top cross-sectional view of a cockpit door without a locking mechanism.

FIG. 3 provides an enlarged cross-sectional view of doors 130 and 132 and walls 202, 204, 206 and 208. In FIG. 3, doors 130 and 132 are in a closed position such that passageway 134 between passenger area 102 and cockpit area 104 is blocked. As shown in FIG. 3, door 130 includes a first indented area or recessed area 300 on the cockpit side 302 of door 130 as well as an indented area or recessed area 304 on a passenger side 306. Similarly, door 132 includes a second indented area or recessed area 310 on the cockpit side 312 of door 132 and an indented area or recessed area 314 on a passenger side 316 of cockpit door 132. Doors 130 and 132 meet to form a joint 320.

Figure 4:
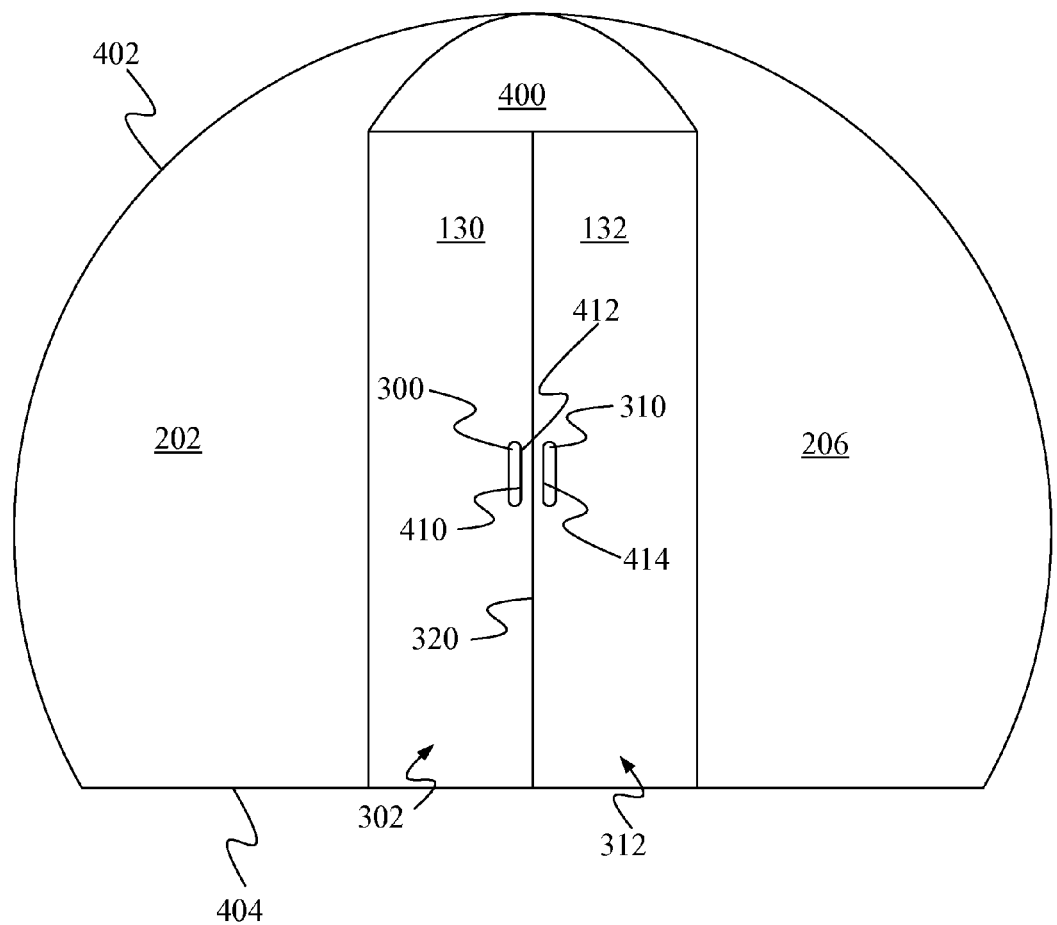
FIG. 4 is a front view of a cockpit door without a locking mechanism.

FIG. 4 provides a front view of cockpit sides 302 and 312 of doors 130 and 132 in a closed position. The front view is from the perspective of cockpit area 104. FIG. 4 also shows walls 202 and 206 and a transom 400. An interior shell 402 extends from a floor 404 around walls 202 and 206 and transom 400.

Indented areas 300 and 310 are shown to be provided near waist level. Indented areas 300 and 310 are provided as handhold areas into which a person's fingers can be placed to slide doors 130 and 132 either into a closed position or an open position.

Indented area 300 is shown to include a frictional member 410 mounted on an interior surface 412 of the indented area 300. Under one embodiment, frictional member 410 is mounted to interior surface 412 by way of an adhesive. Under one embodiment, interior surface 412 is a substantially vertical surface. Frictional member 410, under some embodiments, comprises a hook or loop material such as Velcro® brand hook or loop material. Indented area 310 includes an interior surface 414 that, under one embodiment, is substantially parallel to interior surface 412.

Figure 5:
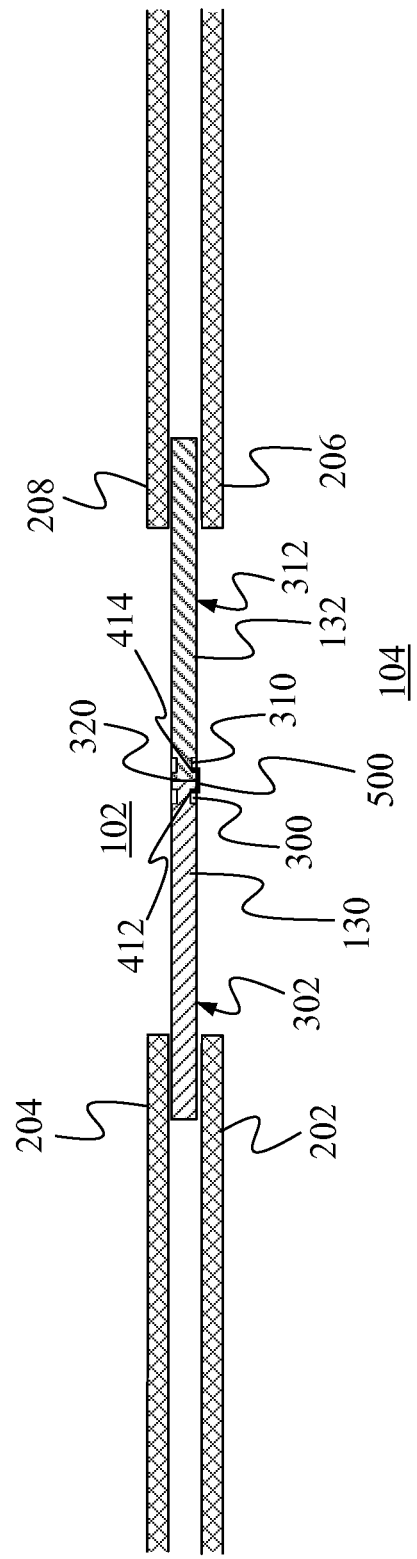
FIG. 5 is a top cross-sectional view of a cockpit door with a locking mechanism.

FIG. 5 provides a top cross-sectional view of doors 130 and 132 having a locking mechanism 500 that engages with indented or recessed area 300 on cockpit side 302 of door 130 and indented or recessed area 310 on cockpit side 312 of door 132, respectively. Locking mechanism 500 engages interior surface 412 of indented area 300 and interior surface 414 of indented area 310 to lock doors 130 and 132 in a closed position such that doors 130 and 132 cannot be separated from each other. In the locked position, a portion of locking mechanism 500 spans the joint or juncture 320 between doors 130 and 132.

Figure 6:
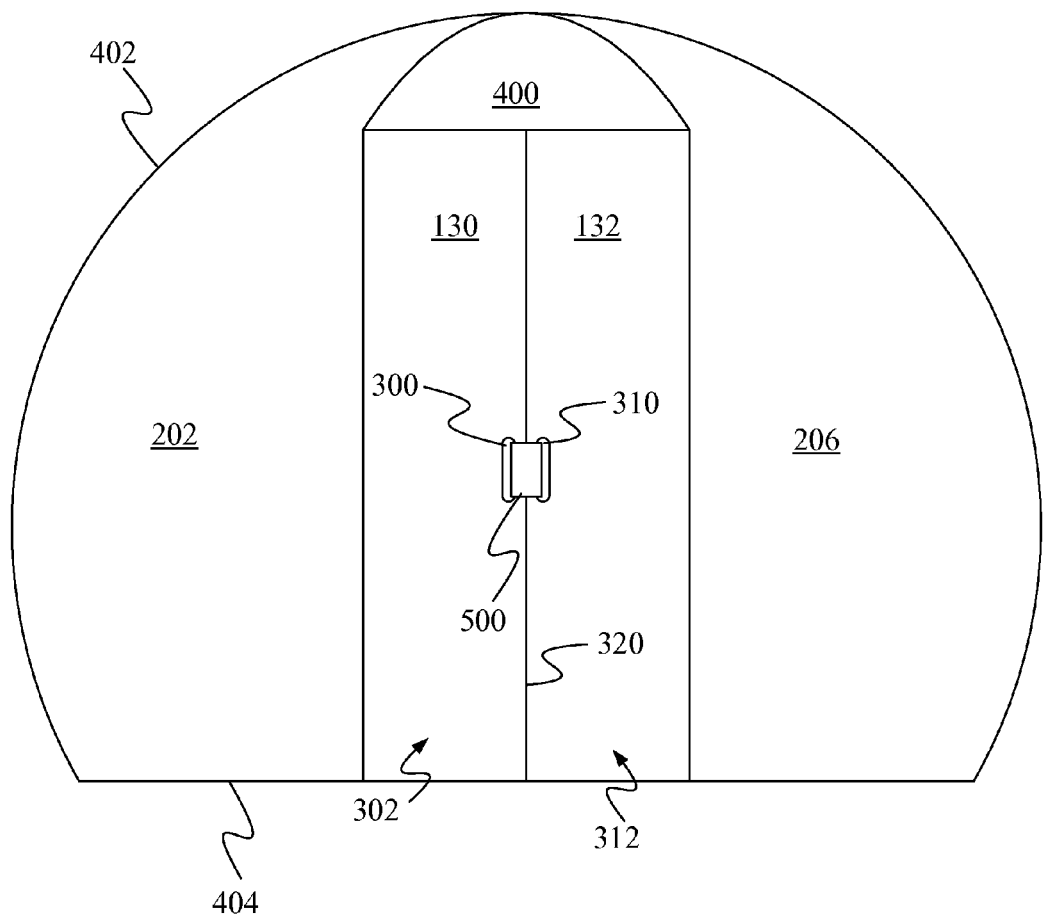
FIG. 6 is a front view of a cockpit door with a locking mechanism.

FIG. 6 provides a front view of doors 130 and 132 with locking mechanism 500 in place to hold doors 130 and 132 in a closed position. FIG. 6 is from the point of view of the cockpit area 104. In FIG. 6, locking mechanism 500 is shown to extend from indented portion 300 to indented portion 310 while spanning joint or juncture 320 where doors 130 and 132 come together. Locking mechanism 500 engages doors 130 and 132 without requiring the surfaces of door 130 or door 132 to be pierced, damaged or permanently altered in any way. Further, when locking mechanism 500 is removed from doors 130 and 132, there is no member left on doors 130 and 132 that would prevent or interfere with door 130 sliding between walls 202 and 204 or that would prevent or interfere with door 132 sliding between walls 206 and 208.

Figure 7:
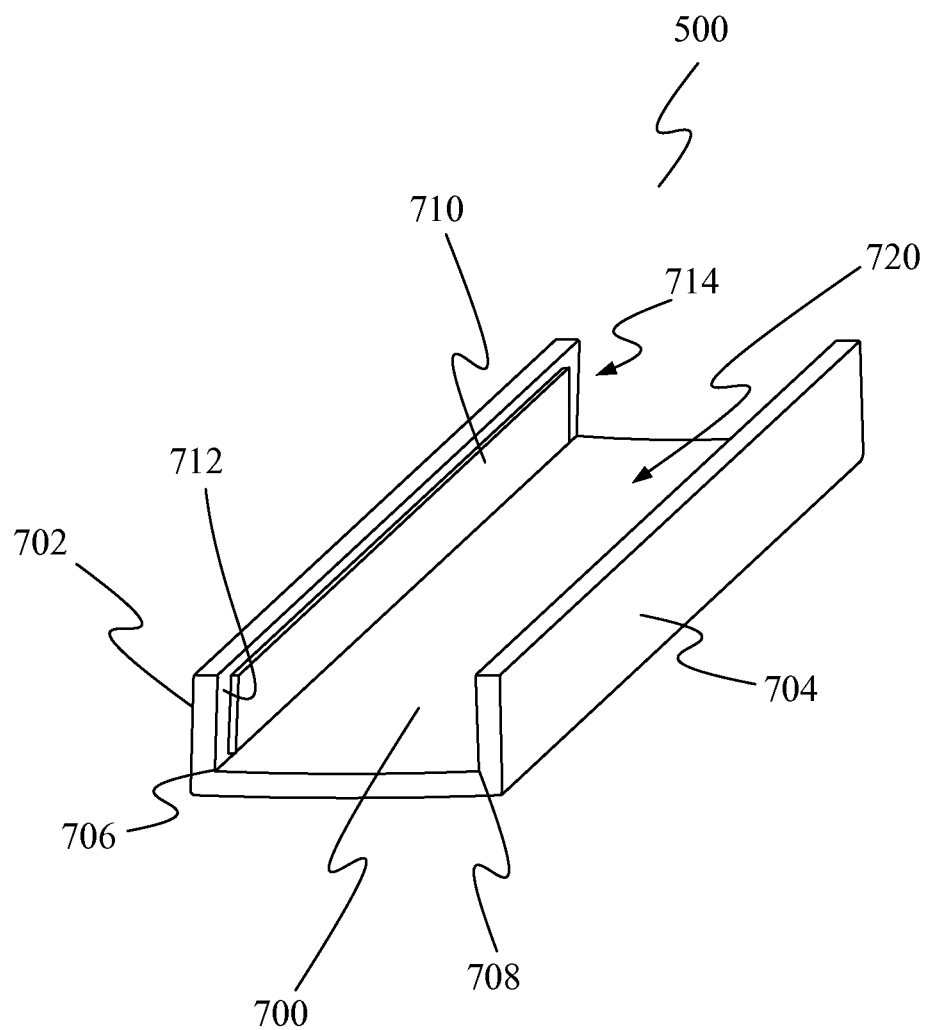
FIG. 7 is a perspective view of a locking mechanism under one embodiment.

FIG. 7 provides a front top perspective view of locking mechanism 500. Locking mechanism 500 includes a first extending arm 702, a second extending arm 704, and a connecting portion 700. First extending arm 702 meets connecting portion 700 at a first junction or corner 706. Second extending arm 704 meets connecting portion 700 at a second junction or corner 708. Extending arm 702 includes an interior surface 712 that has mounted thereon a frictional member 710. Under one embodiment, the frictional member is one of a loop material or hook material such as Velcro® brand hook or loop material. Under one embodiment, frictional member 710 and interior surface 712 of extending member 702 together form a first locking portion 714.

Figure 8:
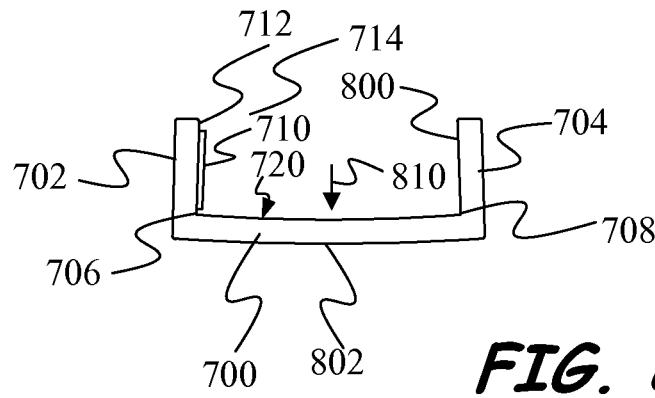
FIG. 8 is a top view of the locking mechanism of FIG. 7.

FIG. 8 provides a top view of locking mechanism 500 showing first locking portion 714 comprising frictional member 710 and first extending surface 712. Extending member 704 comprises a second locking portion 800 also referred to as a second extending surface 800, which is an interior surface of extending member 704. First extending surface 712 and second extending surface 800 extend from interior surface 720 of connecting portion 700.

Connecting portion 700 includes a center point 802 located midway between junction 706 and junction 708. Connecting portion 700 is curved such that center point 802 bows out relative to corners 706 and 708 and the space between extending arms 702 and 704. In particular, center point 802 bows out in a direction 810. The curvature of connecting portion 700 means that the shortest distance along connecting portion 700 between junction corners 706 and 708 is longer than a shortest straight line distance between corners 706 and 708. In embodiments where connecting portion 700 is curved, it may alternatively be referred to as curved portion 700.

The curvature of connecting portion 700 provides a spring force that biases extending arm 702 towards extending arm 704. Thus, when locking mechanism 500 is attached to a cockpit door, the spring force will apply force to the cockpit door to maintain the door in a closed position while also helping to keep the locking mechanism 500 in place.

Figure 9:
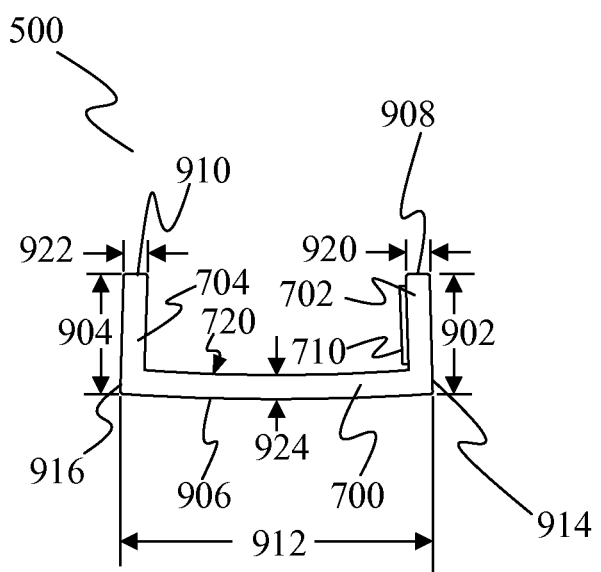
FIG. 9 is a bottom view of the locking mechanism of FIG. 7.

FIG. 9 provides a bottom view of locking mechanism 500. In FIG. 9, extending arms 702 and 704 are shown to have lengths 902 and 904, respectively, measured from an outside surface 906 of connecting portion 700 to respective free surfaces 908 and 910 on extending arms 702 and 704. Under one embodiment, lengths 902 and 904 are ⅝ of an inch (1.5875 cm). In FIG. 9, a distance 912 is provided between an outside surface 914 of extending arm 702 and an outside surface 916 of extending arm 704. Under one embodiment, distance 912 is 1⅝ inch (4.0275 cm).

In FIG. 9, extending arms 702 and 704 have respective thickness 920 and 922. Under one embodiment, thicknesses 920 and 922 are ⅛ of an inch (0.3175 cm). Connecting portion 700 has a thickness 924. Under one embodiment, thickness 925 is also ⅛ of an inch (0.3175 cm).

FIG. 10 provides a side view of locking mechanism 500 showing extending arm 704 extending between outer surface 906 and free surface 910. Extending arm 704 has a top surface 1000 and bottom surface 1002, with a distance 1004 between top surface 1000 and bottom surface 1002. Under one embodiment, distance 1004 is 3 inches (7.62 cm). Extending arm 704 includes rounded corners 1006, 1008, 1010 and 1012 that help prevent damaging doors 130 and 132 when engaging or disengaging locking mechanism 500 and to reduce the likelihood of harming a passenger or crew member with the locking mechanism.

FIG. 11 shows a side view of locking mechanism 500 showing extending arm 702 between bottom surface 906 and free surface 908. Extending arm 704 has a top surface 1100 and a bottom surface 1102, with a distance 1104 between top surface 1100 and bottom surface 1102. Under one embodiment, distance 1104 is 3 inches (7.62 cm). Extending arm 702 includes rounded corners 1106, 1108, 1110 and 1112 that help prevent damaging doors 130 and 132 when engaging or disengaging locking mechanism 500 and to reduce the likelihood of harming a passenger or crew member with the locking mechanism.

FIG. 12 provides a back view of locking mechanism 500 showing extending arm 702, extending arm 704, mounting material 710 and connecting portion 700. Extending arms 702 and 704 are shown as having rounded ends 1200, 1202, 1204 and 1206 to help prevent damaging doors 130 and 132 when engaging and disengaging locking mechanism 500 and to reduce the likelihood of harming a passenger or crew member with the locking mechanism. Connecting portion 700 extends from a bottom end 1208 to a top end 1210 across a height 1212, which under one embodiment is 3 inches (7.62 cm). The shortest distance along connecting portion 710 between corners 706 and 708 is shown as distance 1220. Under one embodiment, distance 1220 is 1⅜ inch (0.9525 cm) and is less than height 1212.

Height 1212 of connecting portion 700 in FIG. 12 is substantially equal to a height 1004 of extending arm 704 and height 1104 of extending arm 702. Height 1104 of extending arm 702 is greater than length 902 of extending arm 702. Similarly, height 1004 of extending arm 704 is greater than length 904 of extending arm 704.

FIG. 13 provides a front view of locking mechanism 500 showing connecting portion 700 extending from side 914 to side 916 and from bottom side 1208 to top side 1210.

Under one embodiment, extending arms 702 and 704 and connecting portion 700 are formed from a single piece of material. Under one example, connecting portion 700 and extending arms 702 and 704 are formed from a single piece of aluminum which is originally straight but is bent so that extending arms 702 and 704 are out of plane with connecting portion 700 and so that connecting portion 700 is curved. In alternative embodiments, locking mechanism 500 is made of extruded aluminum by forcing aluminum through a die shaped to form extending arms 702, 704 and connecting portion 700. In still further embodiments, connecting portion 700 and extending arms 702 and 704 are formed of plastic in a plastic injection molding process. Those skilled in the art will recognize that locking mechanism may be made out of other materials and those materials listed above are simply examples.

Figure 14:
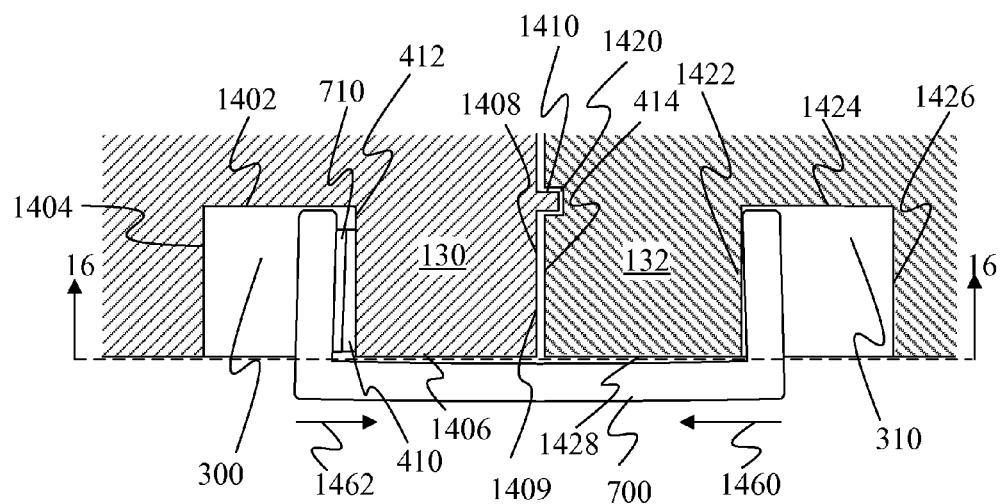
FIG. 14 is a top view of the locking mechanism of FIG. 7 shown engaging doors in a closed position.

FIG. 14 is a top view of locking mechanism 500 in a locking position that maintains doors 130 and 132 in a closed position. In FIG. 14, doors 130 and 132 are shown in cross-section.

Door 130 includes indented region 300 having interior or first side surface 412, a back surface 1402 and a second side surface 1404. Door 130 further includes a front surface 1406 between surface 412 of indented region 300 and a door side edge 1408. Door side edge 1408 includes a planer region 1409 and a wall 1410 extending out of the planer region 1409 and shaped to fit into a channel 1420 of door 132. Interior surface 412 intersects with front surface 1406.

Door 132 includes indented region 310 having interior or first side surface 414, a back surface 1424 and a second side surface 1426. Door 132 also includes a front surface 1428 extending from side surface 414 of indented region 310 to a door side surface 1430 that includes channel 1420. Interior surface 414 intersects with front surface 1428.

Mounted on interior surface 412 is mounting or frictional member 410. Under one embodiment, mounting member 410 is mounted to surface 412 by way of an adhesive. In some embodiments, mounting member 410 is one of a hook or loop material, such as Velcro® brand hook or loop material that frictionally engages with mounting member 710, which under one embodiment is also a hook or loop material.

In the locked position shown in FIG. 14, the curve of connecting portion 700 applies a force in a direction 1460 to surface 414 of door 132 while applying a force in a direction 1462 to surface 412 of door 130, where direction 1460 and direction 1462 are both toward joint 320 between doors 130 and 132. This spring force drives door 130 toward door 132 to maintain doors 130 and 132 in the closed position and to assist in maintaining locking mechanism 500 in its position in indents 300 and 310.

Under one embodiment, mounting member 410 is mounted on door 130 without piercing any surface of the door. Similarly, the first locking portion 714 of locking mechanism 500 engages the surface 412 of indented region 300 through mounting member 410 without piercing any surface of the vehicle and second locking portion 800 of locking mechanism 500 engages surface 414 without piercing any surface of the vehicle.

Figure 15:
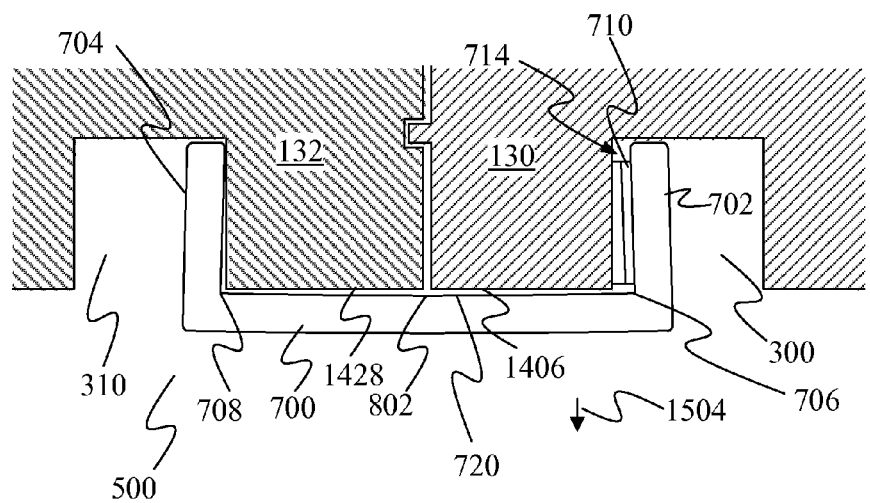
FIG. 15 is a bottom view of the locking mechanism of FIG. 7 shown engaging doors in a closed position.

FIG. 15 shows a bottom view of locking mechanism 500 in indented areas 300 and 310 to maintain doors 130 and 132 in a locked position.

In FIG. 15, it can be seen that a center 802 of connecting portion 700 is further from a straight line containing door surfaces 1428 and 1406 than other portions of interior surface 720 of connecting portion 700 when measured in a direction 1504 from the line. In particular, the distance along direction 1504 from the line containing door surfaces 1428 and 1406 to corners 706 and 708 is less than the distance along direction 1504 from the line containing door surfaces 1428 and 1406 and center 802.

Figure 16:
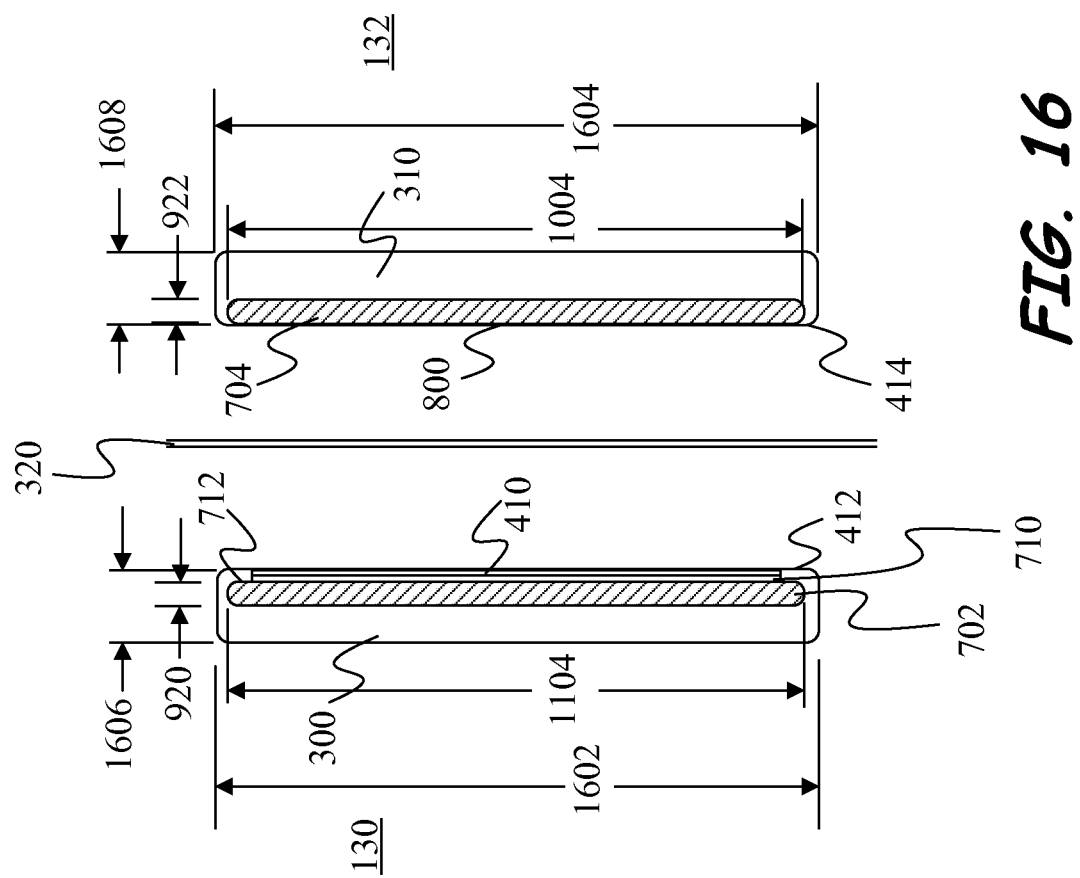
FIG. 16 is a cross-sectional view of the locking mechanism of FIG. 7 shown engaging doors in a closed position.

FIG. 16 shows a cross-sectional front view of locking mechanism 500 positioned in indented regions 300 and 310 of doors 130 and 132 and taken along line 16-16 of FIG. 14. In FIG. 16, connecting portion 700 is not in view but extending arms 702 and 704 can be seen.

In FIG. 16, extending surface 800 of extending arm 704 is shown in direct frictional contact with interior surface 414 of indent 310. Mounting member 710 is shown in frictional contact with mounting member 410 where mounting member 710 is mounted on first extending surface 712 of extending arm 702 and mounting member 410 is mounted on interior surface 412 of indent 300. Doors 130 and 132 in FIG. 16 come together at joint 320.

As shown in FIG. 16, indent 300 has a height 1602 that is greater than the height 1104 of extending arm 702. Similarly, indent 310 has a height 1604 that is greater than the height 1004 of extending arm 704. Further, the width 1606 of indent 300 is greater than the width 920 of extending arm 702 and the width 1608 of indent 310 is greater than the width 922 of extending arm 704.

Figure 17:
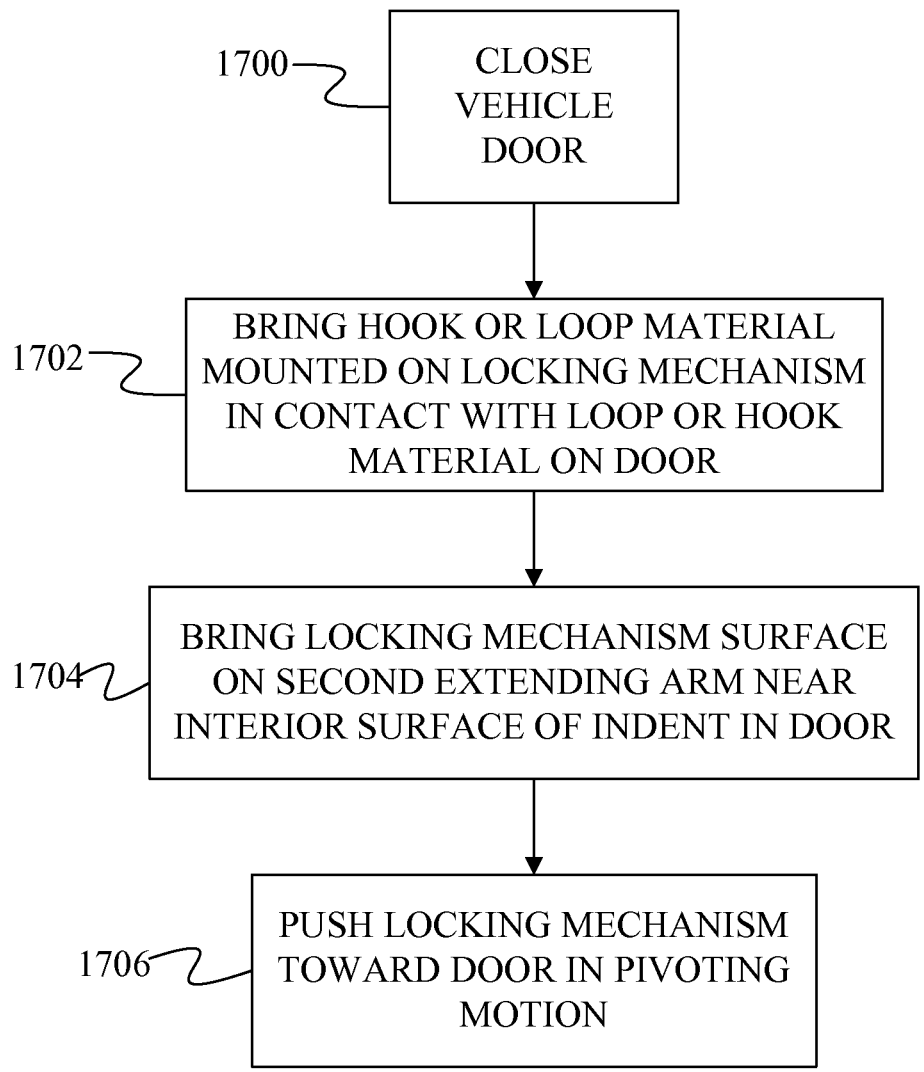
FIG. 17 is a flow diagram of a method of locking a vehicle door under one embodiment.

FIG. 17 provides a flow diagram of a method of engaging a locking mechanism under one embodiment. The method of FIG. 17 begins at step 1700 with the closing of a vehicle door such as an aircraft door between a cockpit area and a passenger area. At step 1702, a hook or loop material on an extending arm of a free standing locking mechanism is brought into contact with a hook or loop material mounted on a surface of one of the doors to as the first step of applying the free standing locking mechanism to the indent of the door. Through this contact, the hook or loop material mounted on the extending arm engages the hook or loop material on the surface of the door. At step 1704, an extending arm of a free standing locking mechanism is placed near a second portion of the aircraft. Under one embodiment, this second portion is an interior surface of an indent in a second door such that a locking surface of the locking mechanism is brought into direct contact with the surface of the door. At step 1706, the locking mechanism is pushed toward the door in a pivoting motion about the point of contact between the hook and loop material to bring a locking surface of an extending arm into contact with a surface of the second portion of the aircraft, which under one embodiment is an indent in a second door. Under one embodiment, two extending arms and a connecting portion of the locking mechanism are formed of a single material and pushing the locking mechanism toward the door brings one of the extending arms in direct contact with a surface of an indent in the door. Through this motion, work is done against a curve of the connecting portion of the locking mechanism such that when the locking mechanism is in a final locked position in the two indents of the doors, the curve of the connecting portion provides a spring force that draws the two doors toward each other and thereby assists in maintaining the door in the closed position.

Disengaging locking mechanism 500, involves reversing the procedure of FIG. 17. First, the extending arm that does not have the loop or hook material is pulled out of its respective indent in the door in a pivoting motion about the hook or loop material on the other extending arm. Once the extending arm without the hook or loop material is free of the indent, the hook or loop material on the extending arm is separated from the hook or loop material on the door to free the locking mechanism from the aircraft.

In the embodiments described above, locking mechanism 500 is free standing such that disengaging the first locking surface from the surface of the indented region and disengaging the second locking surface on the second surface breaks all mechanical connections between the locking mechanism and the vehicle such that the locking mechanism may be removed entirely from the door and the vehicle. In other embodiments, the locking mechanism may be tethered to one or more of the doors.

In the embodiments described above, two pocket doors have been discussed. However, locking mechanism 500 may be used in vehicles with a single sliding door. In such embodiments, the locking mechanism engages an indent in the single sliding door and an indent or outer edge of a frame or wall that the door makes contact with in the closed position.

Although various methods have been shown as separate embodiments above, portions of each method may be combined with all or part of one or more other methods described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A vehicle comprising:
   a passenger section comprising an area for passengers to ride in the vehicle;
   a control section comprising controls for controlling movement of the vehicle;
   a door positioned between the passenger section and the control section and capable of being in an open position to allow passage between the passenger section and the control section and of being in a closed position to prevent passage between the passenger section and the control section, the door comprising an indented region on a side of the door facing the control section when the door is in the closed position, the side of the door facing the control section defining a door plane, and the indented region comprising a surface that is at least partially disposed on an opposite side of the door plane relative to the control section;
   a second surface; and
   a locking mechanism comprising a first planar locking portion, a second planar locking portion and a planer connecting portion connecting the first locking portion and the second locking portion, the locking mechanism locking the door in the closed position when the first locking portion engages the surface of the indented region and the second locking portion engages the second surface, wherein the connecting portion is configured to bias the first and second locking portions toward each other when the first locking portion extends through the door plane and engages the surface of the indented region and the second locking portion engages the second surface, and wherein the connecting portion and the first and second locking portions are formed as a single piece of material.

2. The vehicle of claim 1 further comprising a second door between the passenger section and the control section and capable of being in an open position to allow passage between the passenger section and the control section and of being in a closed position to prevent passage between the passenger section and the control section, the second door comprising a second indented region on a side of the second door facing the control section when the second door is in the closed position, the second indented region comprising the second surface.

3. The vehicle of claim 2 wherein the first door and the second door comprise pocket doors.

4. The vehicle of claim 1 wherein the vehicle comprises an aircraft and the control section comprises a cockpit of an aircraft.

5. The vehicle of claim 1 wherein the first locking portion comprises a frictional member mounted on a first extending surface of the locking mechanism and the second locking portion comprises a second extending surface of the locking mechanism, the first extending surface and the second extending surface extending from the connecting portion.

6. A vehicle comprising:
   a passenger section comprising an area for passengers to ride in the vehicle;
   a control section comprising controls for controlling movement of the vehicle;
   a door positioned between the passenger section and the control section and capable of being in an open position to allow passage between the passenger section and the control section and of being in a closed position to prevent passage between the passenger section and the control section, the door comprising an indented region on a side of the door facing the control section when the door is in the closed position, the indented region comprising a surface;

a second surface; and a locking mechanism comprising a first planar locking portion, a second planar locking portion and a planar connecting portion connecting the first locking portion and the second locking portion, the locking mechanism locking the door in the closed position when the first locking portion engages the surface of the indented region and the second locking portion engages the second surface, wherein the first locking portion comprises a frictional member mounted on a first extending surface of the locking mechanism and the second locking portion comprises a second extending surface of the locking mechanism, the first extending surface and the second extending surface extending from the connecting portion, wherein the first locking portion and the second locking portion extend at least partially into the indented region such that a distance between the connecting portion and the door is less than a length of the first and second locking portions, and wherein the first extending surface, the second extending surface and the connecting portion are formed as a single piece of material.

7. The vehicle of claim 6 wherein the second extending surface contacts the second surface directly.

8. The vehicle of claim 7 wherein the surface of the indented region comprises a second frictional member mounted on a surface of the door.

9. The vehicle of claim 8 wherein the frictional member comprises one of a loop or hook material and the second frictional member comprises one of a loop or hook material.

10. The vehicle of claim 1 wherein the connecting portion is curved such that a center of the connecting portion located between the first locking portion and the second locking portion is further from the door than a juncture between the connecting portion and the first locking portion when the first locking portion engages the surface of the indented region and the second locking portion engages the second surface.

11. A vehicle comprising:

a passenger section comprising an area for passengers to ride in the vehicle;

a control section comprising controls for controlling movement of the vehicle;

a door positioned between the passenger section and the control section and capable of being in an open position to allow passage between the passenger section and the control section and of being in a closed position to prevent passage between the passenger section and the control section, the door comprising an indented region on a side of the door facing the control section when the door is in the closed position, the indented region comprising a surface;

a second surface; and a locking mechanism comprising a first locking portion, a second locking portion and a connecting portion connecting the first locking portion and the second locking portion, the locking mechanism locking the door in the closed position when the first locking portion engages the surface of the indented region and the second locking portion engages the second surface, wherein the connecting portion is curved in a plane shared by the connecting portion, the first locking portion and the second locking portion such that a center of the connecting portion located between the first locking portion and the second locking portion is further from the door than a juncture between the connecting portion and the first locking portion when the first locking portion engages the surface of the indented region and the second locking portion engages the second surface, and wherein the connecting portion provides a spring force that directs the surface of the indented region toward the second surface.

12. The vehicle of claim 1 wherein disengaging the first locking portion from the surface of the indented region and disengaging the second locking portion from the second surface breaks all mechanical connections between the locking mechanism and the vehicle such that the locking mechanism may be removed entirely from the vehicle.

13. The vehicle of claim 8 wherein the second frictional member is mounted on the surface of the door without piercing any surface of the door and the first locking portion engages the surface of the indented region and the second locking portion engages the second surface without piercing any surface of the vehicle.

* * * * *